(12) United States Patent
Ortell et al.

(10) Patent No.: US 11,815,885 B2
(45) Date of Patent: Nov. 14, 2023

(54) SYSTEM AND METHOD FOR SAFE RETENTION OF LOADS WITH STORED POTENTIAL ENERGY

(71) Applicant: Rockwell Automation Technologies, Inc., Mayfield Heights, OH (US)

(72) Inventors: Mark T Ortell, Bayside, WI (US); Kevin J. Riederer, Glendale, WI (US); Aleksey Yegorov, Mequon, WI (US); Sawyer J. Desotelle, Prior Lake, MN (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 341 days.

(21) Appl. No.: 17/172,122

(22) Filed: Feb. 10, 2021

(65) Prior Publication Data

US 2022/0253019 A1    Aug. 11, 2022

(51) Int. Cl.
*G05B 9/02* (2006.01)
*H02P 3/26* (2006.01)
*G05B 19/406* (2006.01)

(52) U.S. Cl.
CPC .......... *G05B 9/02* (2013.01); *H02P 3/26* (2013.01); *G05B 19/406* (2013.01)

(58) Field of Classification Search
CPC ............ G05B 9/02; G05B 19/406; H02P 3/26
See application file for complete search history.

(56) References Cited

U.S. PATENT DOCUMENTS

| 7,253,577 | B2 | 8/2007 | Campbell et al. |
| 7,268,514 | B2 | 9/2007 | DeLange et al. |
| 7,748,793 | B2 | 7/2010 | Hartmann et al. |
| 7,986,115 | B2 | 7/2011 | Jobard |
| 2011/0241447 | A1* | 10/2011 | Ando ............... G05B 19/4063 307/326 |

(Continued)

FOREIGN PATENT DOCUMENTS

| DE | 102013010406 A1 | 1/2014 |
| EP | 1507987 B1 | 11/2010 |

(Continued)

OTHER PUBLICATIONS

Extended European Search Report dated Jun. 13, 2022; Application No. /Patent No. 22152689.0-1202—(8) pages.

*Primary Examiner* — Zoheb S Imtiaz
(74) *Attorney, Agent, or Firm* — Boyle Fredrickson, S.C.

(57) ABSTRACT

An improved system and method for providing safety-rated operation of a motor and motor drive controlling operation of a load with stored potential energy includes a two-channel method of monitoring and retaining control of the load. A first safety channel is configured to control operation of a holding brake, which provides sufficient holding force to retain the stored potential energy in the load. A second safety channel is configured to independently enable and disable torque production from the motor drive controlling operation of the motor. When torque production from the motor drive is enabled, the motor drive and motor are able to provide sufficient torque to retain the stored potential energy in the load. Monitoring and subsequent control of each safety channel is provided to ensure that a single failure in either channel will not cause the unexpected release of the stored potential energy from the load.

15 Claims, 6 Drawing Sheets

(56) References Cited

U.S. PATENT DOCUMENTS

2016/0156288 A1* 6/2016 Sawamura ................ H02P 3/04
318/372
2017/0038748 A1* 2/2017 Nakayama ........... G05B 19/042
2017/0057089 A1* 3/2017 Tsuda ................... G05B 19/406

FOREIGN PATENT DOCUMENTS

| EP | 2372478 A2 | 10/2011 |
| EP | 3000674 A1 | 3/2016 |
| EP | 3025828 A1 | 6/2016 |
| GB | 2457162 A | 8/2009 |

* cited by examiner

SYSTEM AND METHOD FOR SAFE RETENTION OF LOADS WITH STORED POTENTIAL ENERGY

BACKGROUND INFORMATION

The subject matter disclosed herein relates to a system and method for providing a safety-rated function for retaining loads. More specifically, the safety-rated function is configured to prevent a single failure, either in a motor brake or a motor drive, from allowing a load with stored potential energy to release the stored potential energy in an undesired manner.

As is known to those skilled in the art, motor drives are utilized to control operation of a motor. According to one common configuration, a motor drive includes a DC bus having a DC voltage of suitable magnitude from which an AC voltage may be generated and provided to an AC motor. The DC voltage may be provided as an input to the motor drive or, alternately, the motor drive may include a converter section which converts an AC voltage input to the DC voltage present on the DC bus. The motor drive receives a command signal which indicates the desired operation of the motor. The command signal may be a desired torque, speed, or position at which the motor is to operate. The torque, speed, or position of the motor is controlled by varying the amplitude and frequency of the AC voltage applied to the stator of the motor. An inverter section is provided between the DC bus and the output of the motor drive to generate the controlled AC voltage from the DC voltage present on the DC bus to achieve desired operation of the motor.

The motor is, in turn, used to provide a desired motion. The desired motion may, for example, be controlled operation of an axis of motion in an industrial machine or process. The motor may be directly connected, for example, to a flywheel, spindle, or other rotational actuator. Optionally, the motor may be connected via a gearbox to provide rotational motion or to translate rotational motion to linear motion. The axis of motion may be fixed in a horizontal plane, vertical plane, or anywhere in between. The axis, or a combination of axes, may vary between planes, for example, as a first motor causes a second motor to change orientation, such as on a robotic arm.

As is known in the art, desired motion from a motor may be intermittent. Many processes require a motor to move an axis from a first location to a second location and then remain at the second location for a period of time. The period of time the motor remains at the second location may vary from seconds to hours or days depending on the application. In order to conserve energy, it is often desirable to enable the motor drive only while motion is desired. The motor drive receives the command signal corresponding to desired operation of the motor and controls the motor accordingly. When the desired operation of the motor is complete, the command signal is removed and the motor drive may be disabled.

If the motor drive is disabled, it is no longer able to control operation of the motor. If a motor is controlling an axis of motion in which potential energy may be stored, the potential energy may be released when the motor is no longer controlling motion. Examples of systems in which potential energy is stored include, but are not limited to, a system in which a spring is wound, tension is applied to a web of material, or a load is lifted in a vertical plane or in any non-horizontal plane that requires a lifting torque. When the motor no longer controls the load, the motor has a potential for movement as a result of the potential energy being release. For example, the spring may unwind, the tension in the web may be released, or gravity acting on the load may cause the load to lower. If the force on the load as a result of the stored potential energy is sufficient to overcome, for example, mechanical advantage resulting from gearing, friction forces, and the like, the load will start moving when the motor drive is disabled if there is no other holding force preventing such motion.

In order to avoid such undesired motion, it is common to provide a holding brake for motors and axes in which potential energy is stored. The holding brake may be mechanically coupled to the motor, to an output shaft, or at any point along the mechanical drive train that is suited for such coupling according to the application requirements. A common sequence of events to prevent undesired motion as a result of releasing the stored potential energy is to command the motor to come to a stop or to stop motion of the axis. When the axis is at or near a stopped condition, the holding brake is set and the motor drive is then disabled. The holding brake will prevent undesired motion as a result of the stored potential energy. Optionally, the motor drive may be configured to remain enabled while potential energy is stored in the axis and the motor drive receives a command to maintain a constant position. The motor drive monitors the position feedback from the motor to ensure that motor is able to hold the load at the constant position and prevent undesired motion. In either instance, a single system, that is, either the holding brake or the motor drive, is responsible for maintaining a constant position of the motor.

Many industrial machines or processes require interaction with technicians or other personnel. For example, a process line may move a mechanical assembly in position for a worker to add a component to the assembly. A machining center may have a machine head that drills, grinds, cuts, or otherwise interacts with a part and then raises up for unloading of a completed part and loading of a new part. During interaction with a technician or other personnel, the controlled machine or process must provide a safe operating condition for such interaction. These safe operating conditions require that the system be single-failure proof. In other words, if a single component were to fail, or if additional components fail as a result of the initial component failing, the control system is able to maintain the safe operating condition. However, providing a safe operating condition with stored potential energy presents certain challenges.

Historically, it has been known to provide redundant systems in order to achieve a safe operating condition. A fully redundant system may include, for example, a first holding brake and a second holding brake, where each brake is configured to safely hold the maximum expected suspended load. Similarly, the fully redundant system may include a pair of motors and a pair of motor drives, where each motor and motor drive pair is configured to safely control operation of the motion of axis in the event one of the components fails. However, fully redundant systems add significant expense and complexity. Two of each component is required, and the multiple components require extra space. A supervisory system is often required to monitor the system, detect failure of a primary component, and to manage switch-over to a redundant component.

Thus, it would be desirable to provide an improved system and method for providing safety-rated operation of a motor and motor drive controlling operation of a load with stored potential energy.

BRIEF DESCRIPTION

According to one embodiment of the invention, a system for safe retention of loads includes a motor configured to control operation of a load responsive to rotation of the motor, a holding brake configured to prevent rotation of the motor, a position feedback device operatively coupled to the motor and configured to generate a position feedback signal corresponding to an angular position of the motor, and a motor drive. The motor drive is configured to receive a command to stop rotation of the motor, bring the motor to a stop responsive to receiving the command, control operation of the holding brake via a first safety channel, and control operation of torque output to the motor from the motor drive via a second safety channel. The first safety channel is operative to set the holding brake responsive to stopping the motor, and the second safety channel is operative to disable torque production from the motor drive when the holding brake is set. The motor drive monitors the position feedback signal when the holding brake is set, and re-enables torque production via the second safety channel when the position feedback signal changes beyond a predefined threshold with the holding brake set.

According to another embodiment of the invention, a method for safe retention of loads receives a safety rated load retention request at a motor drive and brings the motor to a stop with the motor drive responsive to receiving the safety rated load retention request. The motor drive is operatively connected to a motor configured to lift a load responsive to rotation of the motor. A holding brake, configured to prevent rotation of the motor, is set with the motor drive via a first safety channel within the motor drive responsive to the motor drive stopping the motor. Torque production is disabled from the motor drive via a second safety channel within the motor drive responsive to setting the holding brake via the first safety channel. A position feedback signal, corresponding to an angular position of the motor, is monitored when the holding brake is set and the torque production is disabled, and the torque production is re-enabled via the second safety channel when the position feedback signal changes beyond a predefined threshold with the holding brake set.

According to yet another embodiment of the invention, a motor controller for safely retaining loads includes a motor output configured to supply voltage to a motor operatively connected to the motor controller, a brake output configured to supply an output signal, where the output signal is configured to control operation of a holding brake operatively coupled to the motor to prevent rotation of the motor, a position feedback input configured to receive a position feedback signal generated by a position feedback device operatively coupled to the motor, and a controller. The controller is configured to receive a safety rated load retention request and bring the motor to a stop responsive to receiving the safety rated load retention request. The motor is configured to control operation of a load responsive to rotation of the motor. The controller is further configured to generate the output signal for the brake output with a first safety channel responsive to the motor drive stopping the motor, disable torque production from the motor controller via a second safety channel within the motor drive responsive to generating the output signal, monitor the position feedback signal when the output signal is being generated and the torque production is disabled, and re-enable torque production via the second safety channel when the position feedback signal changes beyond a predefined threshold when the output signal is being generated.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
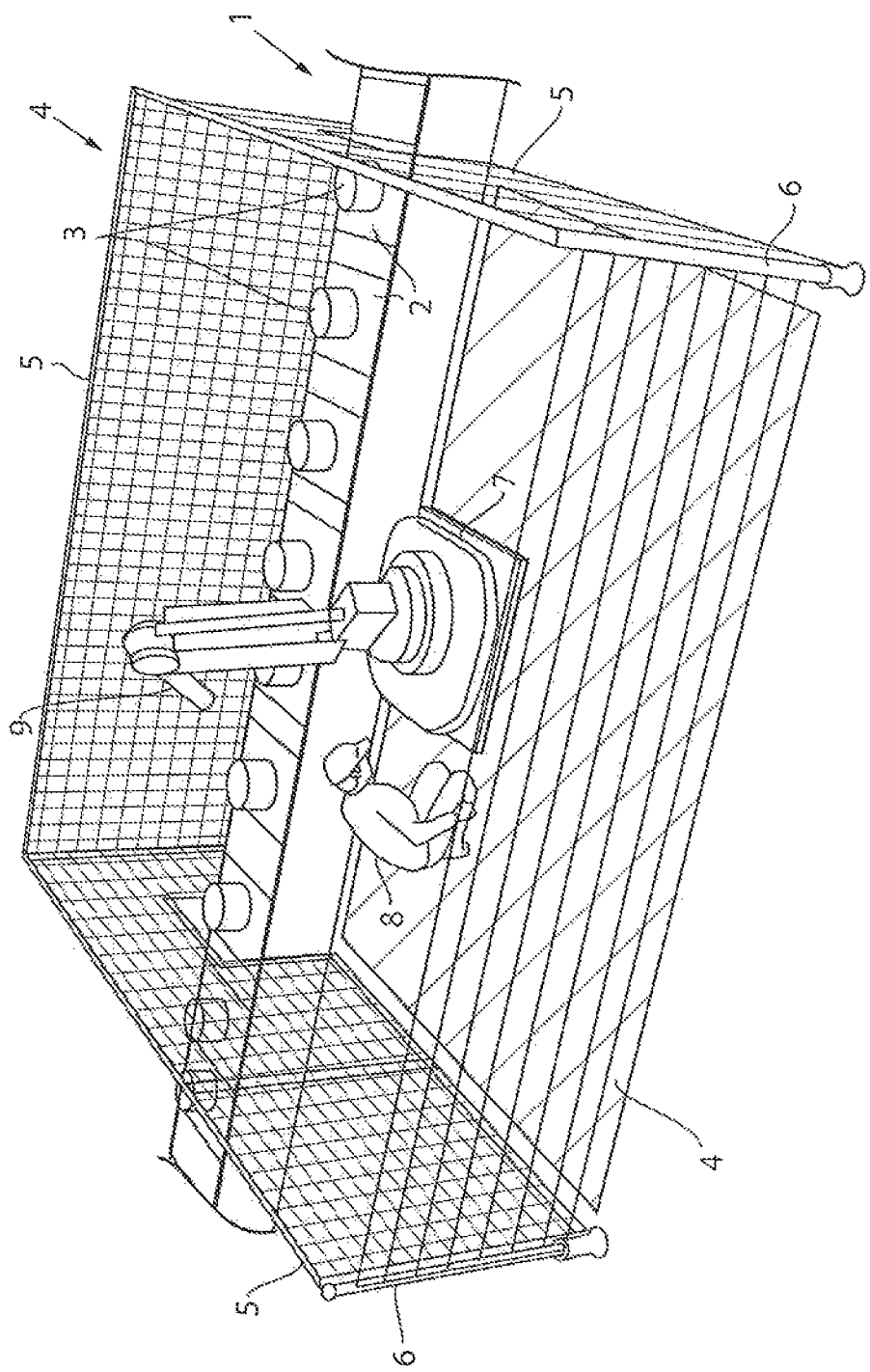
FIG. 1 is an exemplary industrial environment incorporating one embodiment of the invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

The subject matter disclosed herein describes an improved system and method for providing safety-rated operation of a motor and motor drive controlling operation of a load with stored potential energy. The system provides for a two-channel method of monitoring and retaining control of the load. A first safety channel is configured to control operation of a holding brake, where the holding brake provides sufficient holding force to prevent motion in the load resulting from the stored potential energy. A second safety channel is configured to independently provide feedback monitored control of the motor via the motor drive. One function of the second safety channel is to enable and disable torque production from the motor drive controlling operation of the motor. When torque production from the motor drive is enabled, the motor drive and motor are able to provide sufficient torque to prevent motion in the load resulting from the stored potential energy. Monitoring and subsequent control of each safety channel is provided to ensure that a single failure in either channel will not cause the unexpected release of the stored potential energy from the load.

Turning initially to FIG. 1, an exemplary application incorporating one embodiment of the invention includes a conveyor system 1 transporting a series of pallets 2 with a part 3 loaded on each pallet. The conveyor system 1 passes through a protected region 4, where the protected region has fencing 5 on three sides and a light barrier 6 on the fourth side. A robot, 7, interacts with each part 3 as it travels through the protected region 4. As illustrated, a technician 8 may need to periodically enter the protected region 4. The technician 8 may, for example, need to perform periodic maintenance on the robot 7 or conveyor system 1. Optionally, personnel may need to inspect a part 3 passing through the enclosed region 4. By requiring entry through the light barrier 6, an industrial controller, such as a programmable logic controller (PLC), may detect an interruption in the light barrier 6 as the technician 8 enters the protected region 4 and then put the robot 7 and/or conveyor system 1 into a safe operating state to prevent injury to the technician 8. The safe operating state may simply cause motion of the robot 7 and or conveyor system 1 to stop motion. As illustrated, an arm 9 of the robot 7 may be raised, or partially raised, and constitute a suspended load. In order to ensure the protected region 4 is safe for the technician 8, it is necessary to ensure that the arm 9 does not inadvertently lower, causing injury to the technician 8 inspecting the base of the robot 7.

Figure 2:
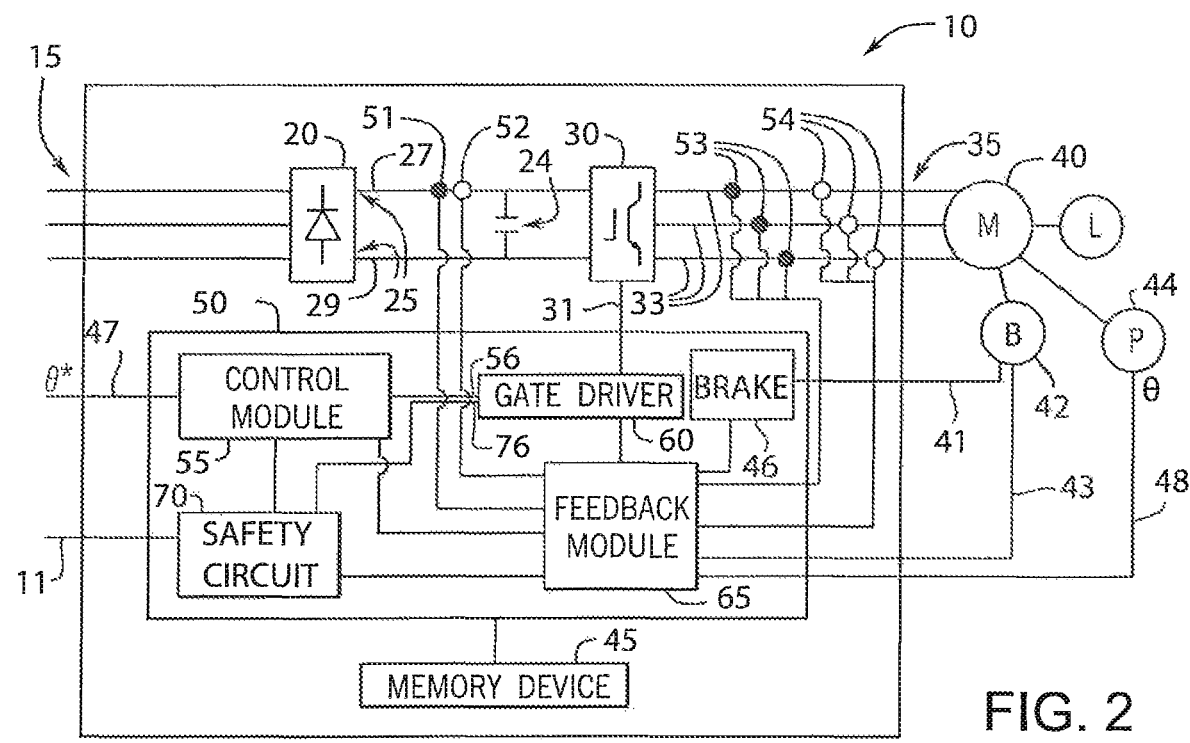
FIG. 2 is a block diagram of a motor drive incorporating one embodiment of the present invention.
Figure 3:
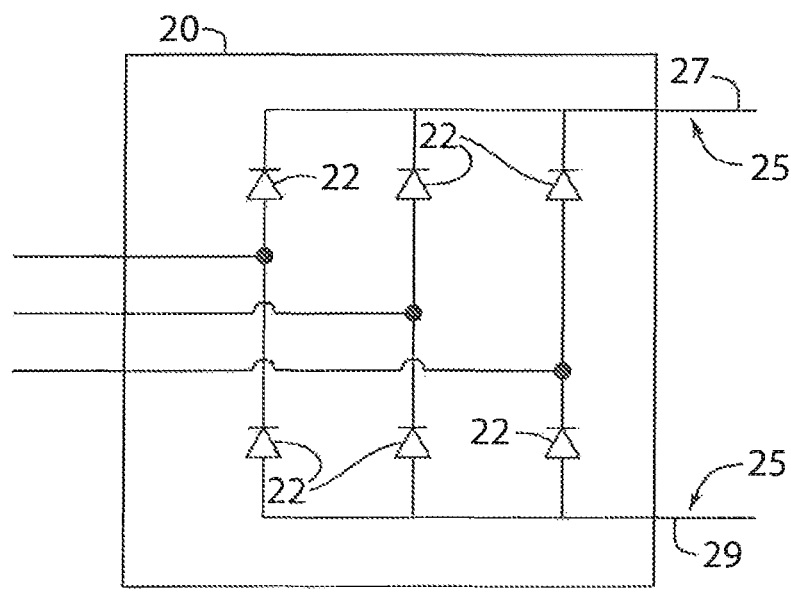
FIG. 3 is a block diagram representation of a rectifier section from the motor drive of FIG. 2.

Turning next to FIG. 2, a motor drive 10 may be operatively connected to a motor 40, which is, in turn, configured to control a load, L, such as raising and lowering the arm 9 of the robot 7 shown in FIG. 1. The motor drive 10, which may incorporate the various embodiments of the invention disclosed herein, is configured to receive a three-phase AC voltage at an input 15 of the motor drive 10. The input 15 of the motor drive is connected to a rectifier section 20 of the motor drive 10 and provides the three-phase AC voltage to the rectifier section 20. The rectifier section 20 may include any electronic device suitable for passive or active rectification as is understood in the art. With reference also to FIG. 3, the illustrated rectifier section 20 includes a set of diodes 22 forming a diode bridge that rectifies the three-phase AC voltage to a DC voltage on the DC bus 25. Optionally, the rectifier section 20 may include other solid-state devices including, but not limited to, thyristors, silicon-controlled rectifiers (SCRs), or transistors to convert the input power 15 to a DC voltage for the DC bus 25. The DC voltage is present between a positive rail 27 and a negative rail 29 of the DC bus 25. A DC bus capacitor 24 is connected between the positive and negative rails, 27 and 29, to reduce the magnitude of the ripple voltage resulting from converting the AC voltage to a DC voltage. It is understood that the DC bus capacitor 24 may be a single capacitor or multiple capacitors connected in parallel, in series, or a combination thereof. The magnitude of the DC voltage between the negative and positive rails, 29 and 27, is generally equal to the magnitude of the peak of the AC input voltage.

Figure 4:
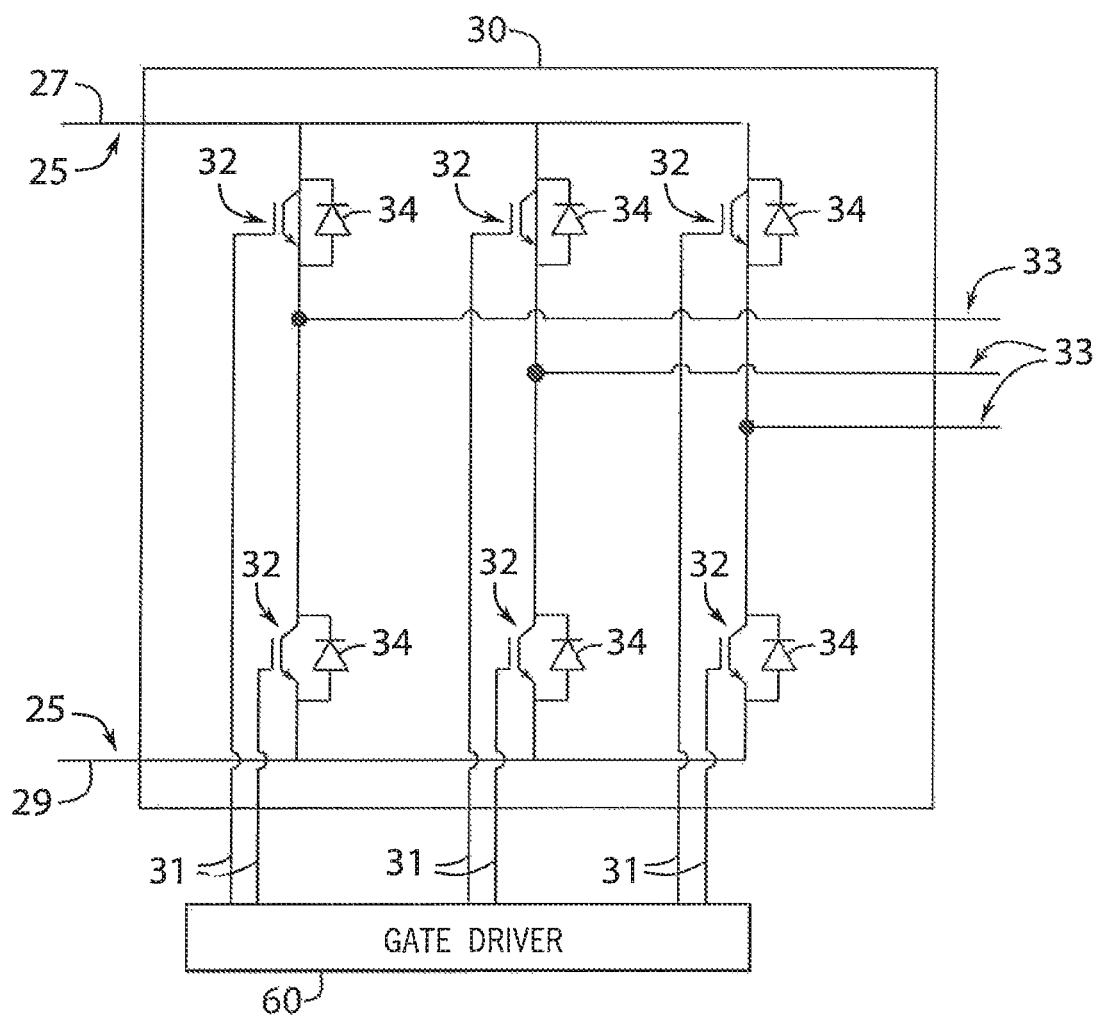
FIG. 4 is a block diagram representation of an inverter section and gate driver module from the motor drive of FIG. 2.

The DC bus 25 is connected in series between the rectifier section 20 and an inverter section 30. Referring also to FIG. 4, the inverter section 30 consists of switching elements, such as transistors, thyristors, or SCRs as is known in the art. The illustrated inverter section 30 includes an insulated gate bipolar transistor (IGBT) 32 and a free-wheeling diode 34 connected in pairs between the positive rail 27 and each phase of the output voltage as well as between the negative rail 29 and each phase of the output voltage. Each of the IGBTs 32 receives gating signals 31 to selectively enable the transistors 32 and to convert the DC voltage from the DC bus 25 into a controlled three phase output voltage to the motor 40. When enabled, each transistor 32 connects the respective rail 27, 29 of the DC bus 25 to an electrical conductor 33 connected between the transistor 32 and the output terminal 35. The electrical conductor 33 is selected according to the application requirements (e.g., the rating of the motor drive 10) and may be, for example, a conductive surface on a circuit board to which the transistors 32 are mounted or a bus bar connected to a terminal from a power module in which the transistors 32 are contained. The output terminals 35 of the motor drive 10 may be connected to the motor 40 via a cable including electrical conductors connected to each of the output terminals 35.

One or more modules are used to control operation of the motor drive 10. According to the embodiment illustrated in FIG. 2, a controller 50 includes the modules and manages execution of the modules. The illustrated embodiment is not intended to be limiting and it is understood that various features of each module discussed below may be executed by another module and/or various combinations of other modules may be included in the controller 50 without deviating from the scope of the invention. The modules may be stored programs executed on one or more processors, logic circuits, or a combination thereof. The controller 50 may be implemented, for example, in a microprocessor, application specific integrated circuit (ASIC), field programmable gate array (FPGA), or other such customizable device. The motor drive 10 also includes a memory device 45 in communication with the controller 50. The memory device 45 may include transitory memory, non-transitory memory or a combination thereof. The memory device 45 may be configured to store data and programs, which include a series of instructions executable by the controller 50. It is contemplated that the memory device 45 may be a single device, multiple devices, or incorporated, for example, as a portion of another device such as an application specific integrated circuit (ASIC). The controller 50 is in communication with the memory 45 to read the instructions and data as required to control operation of the motor drive 10.

The controller 50 receives a reference signal 47 identifying desired operation of the motor 40 connected to the motor drive 10. The reference signal 47 may be, for example, a position reference ($\theta^*$), a speed reference ($\omega^*$), or a torque reference ($T^*$). For a high performance servo control system, the reference signal 47 is commonly a position reference signal ($\theta^*$).

The controller 50 also receives feedback signals indicating the current operation of the motor drive 10. According to the illustrated embodiment, the controller 50 includes a feedback module 65 that may include, but is not limited to, analog to digital (A/D) converters, buffers, amplifiers, and any other components that would be necessary to convert a feedback signal in a first format to a signal in a second format suitable for use by the controller 50 as would be understood in the art The motor drive 10 may include a voltage sensor 51 and/or a current sensor 52 on the DC bus 25 generating a feedback signal corresponding to the magnitude of voltage and/or current present on the DC bus 25. The motor drive 10 may also include one or more voltage sensors 53 and/or current sensors 54 on the output phase(s) of the inverter section 30 generating a feedback signal corresponding to the magnitude of voltage and/or current present on the electrical conductors 33 between the inverter section 30 and the output 35 of the motor drive.

The controller 50 utilizes the feedback signals and the reference signal 47 to control operation of the inverter section 30 to generate an output voltage having a desired magnitude and frequency for the motor 40. The feedback signals are processed by the feedback module 65 and converted, as necessary, to signals for the control module 55. The control module 55 also receives the reference signal 47 and executes responsive to the reference signal 47 and the feedback signals to generate a desired output voltage signal to a gate driver module 60. The gate driver module 60 generates the gating signals 31, for example, by pulse width modulation (PWM) 62 (see also FIG. 7) or by other modulation techniques. The gating signals 31 subsequently enable/disable the transistors 32 to provide the desired output voltage to the motor 40, which, in turn, results in the desired operation of the mechanical load, L, coupled to the motor 40.

The controller 50 includes a brake module 46 configured to control operation a holding brake 42 operatively connected to the motor 40. In some embodiments of the invention, the holding brake 42 may be connected to engage a portion of a drive train, such as a drive shaft remotely located from the motor 40 and between the motor 40 and the driven component of the industrial machine or process. The brake module 46 is configured to generate a control signal 41 to release and set the brake. A brake set feedback signal 43 is input to the motor drive 10, passing through the feedback module 65 and back to the brake module 46. When it is desired to operate the motor 40, the brake module 46 is configured to generate the control signal 41 to release the brake and to monitor the brake set feedback signal 43 to verify the brake has been released. When the motor 40 is stopped, the brake module 46 is configured to reset the control signal 41 to release the brake and to monitor the brake set feedback signal 43 to verify that the holding brake 42 is set. Operation of the brake module 46 will be discussed in more detail below.

Figure 5:
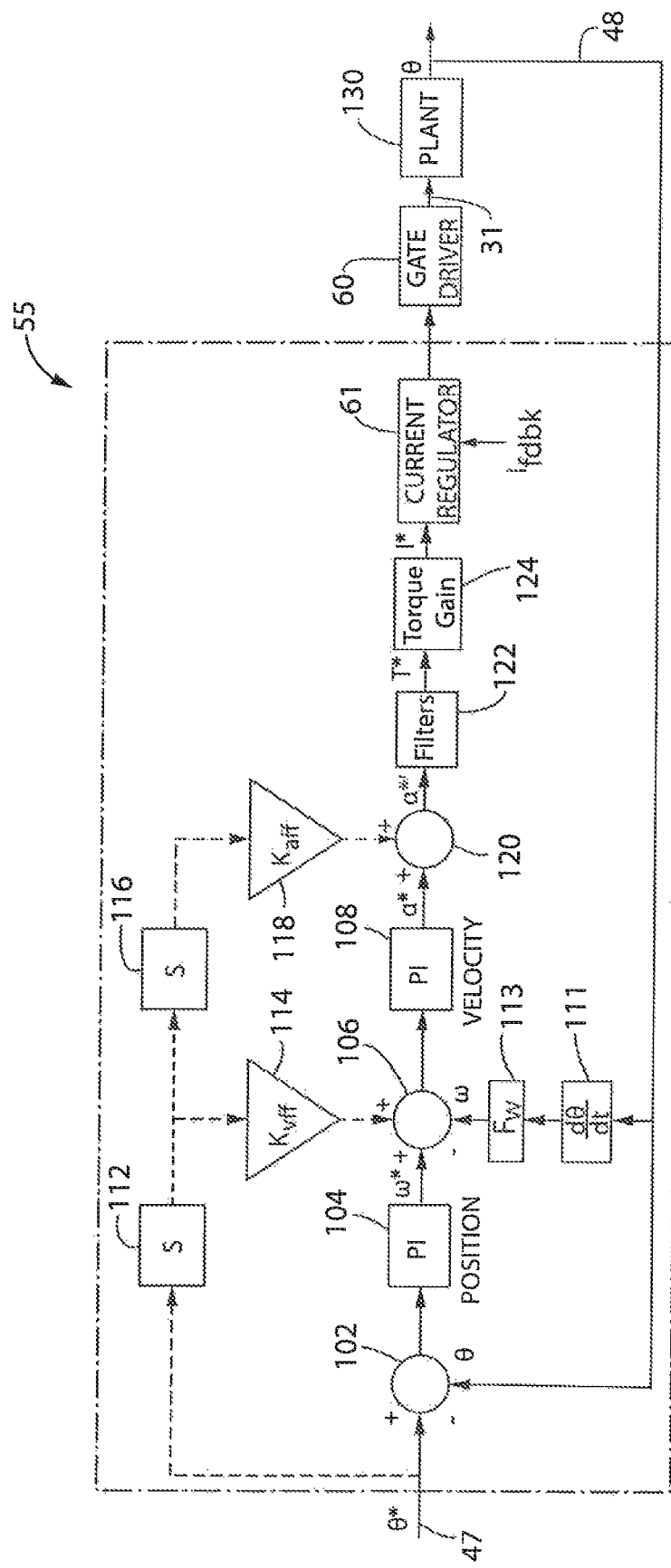
FIG. 5 is a block diagram representation of one embodiment of a controller from the motor drive of FIG. 2.

Referring next to FIG. 5, an exemplary control module 55 for the motor drive 10 is illustrated. The control module 55 receives the position reference signal ($\theta^*$) 47 as an input. The control module 55 includes a number of control loops. According to the embodiment illustrated in FIG. 5, the control module 55 includes a position control loop, a velocity control loop, and a current control loop. The control loops are shown as cascading control loops where an output of one control loop is provided as an input to another control loop. It is contemplated that various other control topologies may be utilized within the motor drive 10.

In the position control loop, the position reference signal ($\theta^*$) 47 is compared to a position feedback signal ($\theta$) 48 at a first summing junction 102. A position error signal is output from the first summing junction 102 and input to a position loop controller 104. According to the illustrated embodiment, the position loop controller 104 is a proportional-integral (PI) controller. Optionally, the position loop controller 104 may be just a proportional (P) controller or further include a derivative (D) component. Each of the proportional (P), integral (I), and/or derivative (D) components of the position loop controller 104 includes a controller gain. The position loop controller gains are commonly referred to as a position loop proportional gain (Kpp), position loop integral gain (Kpi), and a position loop derivative gain (Kpd). The output of the position loop controller 104 is a velocity reference signal ($\omega^*$).

In the velocity control loop, the velocity reference signal ($\omega^*$) is compared to a velocity feedback signal ($\omega$) at a second summing junction 106. The velocity feedback signal ($\omega$) is generated by taking a derivative, as shown in the derivative block 111, of the position feedback signal ($\theta$). The velocity feedback signal ($\omega$) may also be filtered by a velocity filter block 113. A velocity error signal is output from the second summing junction 106 and input to a velocity loop controller 108. According to the illustrated embodiment, the velocity loop controller 108 is a proportional-integral (PI) controller. Optionally, the velocity loop controller 108 may be just a proportional (P) controller or further include a derivative (D) component. Each of the proportional (P), integral (I), and/or derivative (D) components of the velocity loop controller 108 includes a controller gain. The velocity loop controller gains are commonly referred to as a velocity loop proportional gain (Kvp), velocity loop integral gain (Kvi), and a velocity loop derivative gain (Kvd). The output of the velocity loop controller 108 is an acceleration reference signal.

The control module 55 may also include feed forward branches. According to the illustrated embodiment, the control module 55 includes feed forward branches for both the velocity and the acceleration elements. The position reference signal ($\theta^*$) is passed through a first derivative element 112 to obtain a velocity feed forward signal. The velocity feed forward signal is multiplied by a velocity feed forward gain (Kvf) 114 and combined with the velocity reference signal ($\omega^*$) and the velocity feedback signal ($\omega$) at the second summing junction 106. The velocity feed forward signal is passed through a second derivative element 116 to obtain an acceleration feed forward signal. The acceleration feed forward signal is multiplied by an acceleration feed forward gain (Kaf) 118 and combined with the acceleration reference signal at a third summing junction 120 to generate a modified acceleration reference signal ($\alpha^{*\prime}$). As is understood in the art, the output of the third summing junction 120 is also commonly referred to as a torque reference signal. The angular acceleration in a motor is proportional to the torque and may be found by multiplying the angular acceleration by the inertia. In one embodiment of the control module 55, the inertia may be incorporated into the controller gains for the velocity loop controller 108 and the feed forward gain 118, thereby saving a calculation within the controller 50. Optionally, an inertia gain block may be included after the summing junction 120 to convert the modified acceleration reference signal ($\alpha^{*\prime}$) to a torque reference signal.

The modified acceleration reference signal ($\alpha^{*\prime}$) or torque reference signal output from the third summing junction 120 is further processed prior to generating gate signals 31 for the inverter section 30. The modified acceleration reference signal ($\alpha^{*\prime}$) or torque reference signal is provided as an input to a filter section 122. The filter section 122 may include one or more filters to remove unwanted components from the control system, such as a low pass filter to attenuate undesirable high frequency components or a notch filter to attenuate specific frequency components having an undesirable effect on the controlled mechanical load. It is further contemplated that additional filters may be included in the filter section without deviating from the scope of the invention. It is further contemplated that the inertia gain may be incorporate into a filter or within a gain inside the filter section 122. Whether provided as an input to the filter section 122 or converted within the filter section 122, the output of the filter section 122 is a torque reference, T*.

The output of the filter section 122 is passed through a torque gain block 124. The torque gain block 124 includes a torque constant (Kt) which defines a relationship between the current provided to the motor 40 and the torque output by the motor. The torque gain block 124 may include one or more additional gain elements combined with the torque constant (Kt) to produce a desired current reference (I*) to a current regulator 61. The current regulator receives a current feedback signal (Ifdbk) from the current sensors 54 at the output of the motor drive 10 and utilizes a current controller, which may include proportional, integral, and/or derivative components to regulate the current in the motor 40. The output of the current regulator 61 is provided to the gate driver 60 which, in turn, generates the switching signals 31 to the inverter section 30.

The output of the gate driver 60 is illustrated as being supplied to the plant 130 of the controlled system. In a motion control system, the plant 130 typically includes the inverter section 30 of the motor drive 10, the motor 40, a mechanical load, a position feedback device 44, and mechanical couplings between the motor 40 and mechanical load or between the motor 40 and a position feedback device 44. The position feedback device 44 generates the position feedback signal (θ) used by the control module 55.

With reference again to FIG. 2, the output of the control module 55 is provided as an input to the gate driver module 60. The gate driver module 60 converts the output of the current regulator to a desired output voltage having a variable amplitude and frequency, where the amplitude and frequency are selected to produce the desired operation of the motor 40. The gate driver module 60 then generates the gating signals 31 used by pulse width modulation (PWM) or by other modulation techniques to control the switching elements in the inverter section 30 to produce the desired output voltage. The gating signals 31 subsequently enable/disable the transistors 32 to provide the desired output voltage to the motor 40, which, in turn, results in the desired operation of the mechanical load coupled to the motor 40.

In certain applications, typically when human interaction is required with a controlled machine or process, control of the machine or process must occur according to a specified safety rating. Safety ratings define a level of risk associated with a specific hazard in an application. One common industrial standard for defining these levels of risk is the Safety Integrity Level (SIL) standard defined according to the International Electrotechnical Commission (IEC). The IEC defines four different SIL ratings, where SIL-1 is the lowest safety level and SIL-4 is the highest safety level. Each safety level defines a probability at which a failure may occur. In order to achieve a certain safety level, the control system must be configured such that, based on a risk analysis of the system, the control system satisfies the probability of a failure occurring for a desired safety level. One common way an industrial control system may achieve a desired safety rating is to provide redundancy in a system. Redundancy allows a single failure to occur within the control system while maintaining safe control of the system.

Providing independent safety channels within the controller, where each safety channel is operationally independent of the other, may allow the control system to achieve a desired safety rating. The desired safety rating may be, for example, a SIL-3 safety rating according to the IEC standard or a Category 3 safety rating according to a Machine Safety Standard 13849-1 (MSS). It is contemplated that the two independent safety channels may even be configured to achieve a Category 4 safety rating under MSS.

As previously indicated, there are numerous applications in which a load may acquire potential energy. These include, but are not limited to, a spring winding up, tension being applied to a web of material, or a load being raised. For ease of discussion, this specification will refer to an application in which a load is being suspended as one type of application in which a safety rating may be required. Suspension of a load does not necessarily require vertical lifting of a load. Any load which requires a motor to move and which, upon removal of control by the motor may be acted upon by gravity to cause motion of that load may be considered suspended. This includes, for example, a robotic arm, as illustrated in FIG. 1, which may rotate about a pivot point or a conveyor system operating on an incline. This application is intended to be exemplary and not limiting and it is understood that the concepts discussed herein could apply to other loads in which potential energy is stored in the load or in the system as a result of controlling the motor 40 with the motor drive 10.

In operation, the motor drive 10 receives multiple input signals to define desired operation of the motor drive 10. The input signals include, for example, an enable input signal which enables the controller 50 within the motor drive to execute various modules, including the control module 55, the brake module 46 and the like. The input signals also include a run command and/or a stop command. Optionally, a single input signal may be provided which corresponds to a run command in one state and a stop command in an opposite state. In still another embodiment, an analog input signal may define a desired speed of operation of the motor, wherein when the analog input is at zero volts, the motor 40 is commanded to stop and when the analog input is at a maximum voltage, such as any voltage in the range of 5-24 VDC and which may be set by a parameter stored in memory 45, the motor is commanded to operate at rated speed. Still another input signal may be provided to indicate a desired direction of rotation of the motor 40. Each of the input signals are provided to the controller 50, where a series of instructions executing on a processor, a logic circuit, or a combination thereof, receive the input signals and cause the motor drive 10 to execute accordingly. The input signals may be provided as discrete signals at separate input terminals or be provided as data stored within a data packet communicated via an industrial network.

The present invention provides a system for safety-rated operation of a motor and a holding brake controlling operation of a suspended load. A first safety channel is provided within the motor drive 10 to control the holding brake 42, and a second safety channel is provided within the motor drive 10 to independently provide feedback monitored control of the motor via the motor drive, where one function of the second safety channel is to enable torque production in the motor 40. The two safety channels prevent a single failure from occurring which may cause a suspended load from lowering unexpectedly. The controller 50 of the motor drive is configured to provide two independent control channels and redundancy according to a desired safety level. It is contemplated, that each input signal may be provided as a redundant input signal with a logic input interface comparing inputs to verify that pairs of input signals are in the same state. The controller 50 may include redundant processors and/or logic circuits with comparison between inputs and outputs of the processor and/or logic circuits verifying correct operation of the controller 50. The first safety channel may include a logic circuit, a processor, or a combination thereof within the controller 50 which is configured to control operation of the holding brake 42. The second safety channel may similarly include a logic circuit, a processor, or a combination thereof within the controller 50 which is configured to enable torque production in the motor 40. It is contemplated that each safety channel may be implemented in part, or on whole using the same redundant components, such as the same pair of processors or the same pair of input signals. However, the first and second safety channels operate independently of each other within the controller to the extent that a failure of one channel will not cause a failure of the other channel.

Figure 6:
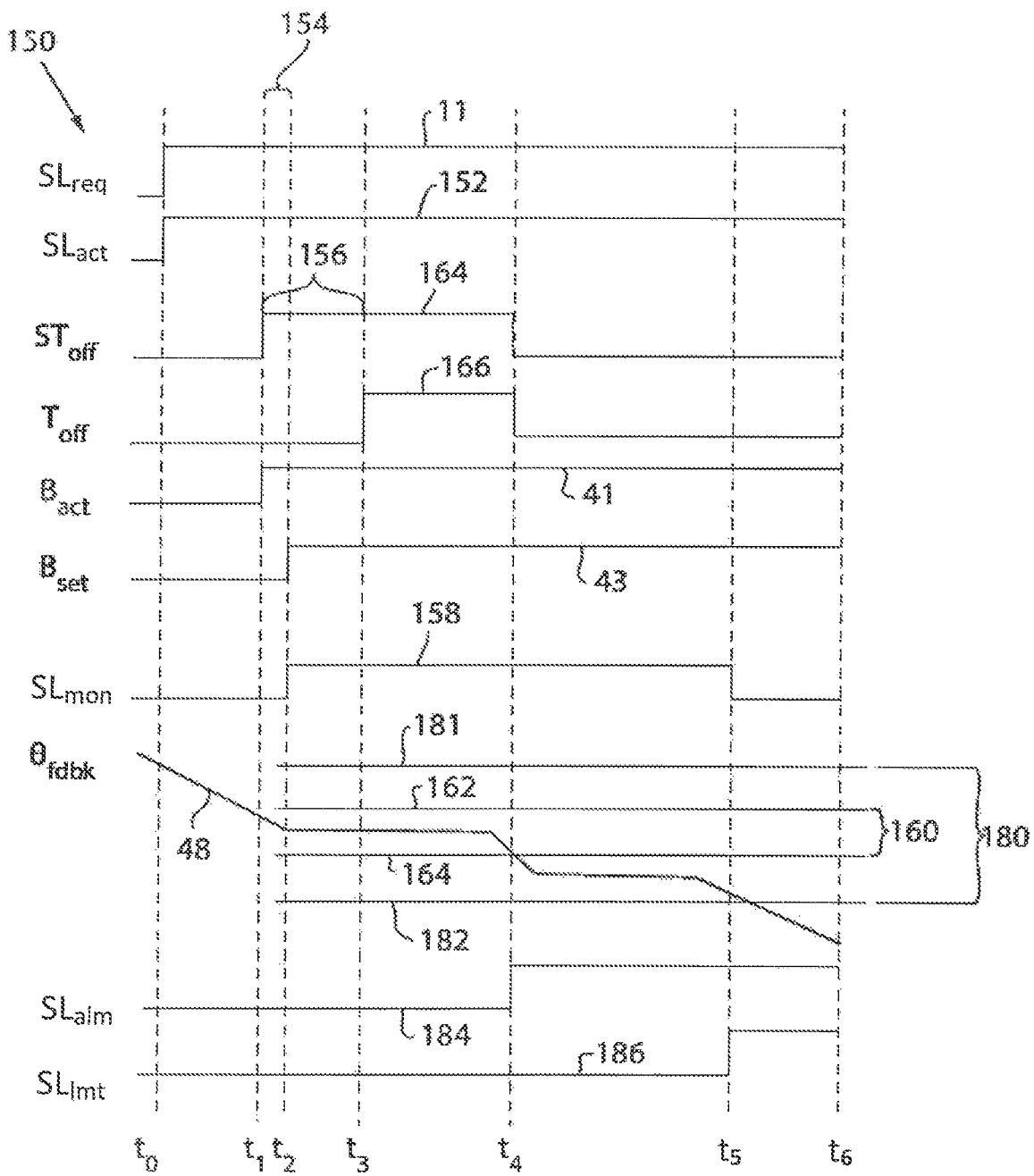
FIG. 6 is a timing chart illustrating steps for safe suspension of loads according to one embodiment of the invention.

Turning next to FIG. 6, a timing chart 150 illustrates steps for safe suspension of loads using the first and second safety channels according to one embodiment of the invention. At time, t0, a safety rated load retention request (SLreq) signal 11 is received at an input to the motor drive 10. The motor drive 10 verifies that the safety rated load retention request may begin and sets an internal status flag 152 indicating that a safe load retention process is active (SLact). Between times t0 and t1, the motor drive 10 is configured to bring the motor 40 to a stop. Once the motor 40 has reached zero speed or is below a minimum speed threshold, the motor drive 10 commands the brake to set. The brake module 46 in the controller 50 removes a Brake active (Bact) signal 41, as shown at time t1, which de-energizes a brake coil and, in turn, causes the holding brake 42 to set. A first delay time 154 passes between commanding the holding brake 42 to set at time t1 and the holding brake physically being set as indicated by the Brake Set (Bset) feedback signal 43 transitioning to high at time t2.

Once the Brake Set signal 43 is received, the controller 50 begins monitoring the position feedback signal 48, θ, for undesired motion, and a Safe Load Monitor (SLmon) status bit 158 is set. When the holding brake 42 is set, there should be no motion on the motor 40, and the position feedback signal 48, θ, should remain at a constant value, corresponding to the angular position at which the motor 40 was located when the brake set. A first bandwidth 160 is set within the motor drive 10 corresponding to an acceptable level of movement of the motor 40 with the holding brake set. The movement may occur, for example, as a few additional counts being read as a result of vibration of the holding brake 42 setting or from the brake set signal 43 being triggered before the holding brake 42 is fully set. To avoid nuisance or erroneous trips, an upper acceptable limit 162 and a lower acceptable limit 164 define the bandwidth 160 within which the position feedback signal 48 may change. It is contemplated that the bandwidth 160 is defined by one or more parameters stored within the memory device 45 of the motor drive 10 and is user configurable according to the application requirements. A single parameter may define the bandwidth 160 or an acceptable difference between the position feedback signal 48, θ, and a change in position. Optionally, a first parameter may define the upper acceptable limit 162 and a second parameter may define the lower acceptable limit 164. If the position feedback signal 48, θ, remains within the bandwidth 160 while the brake is set, no action is required by the safe load retention function. A second delay time 156 is defined within the safe vertical function which defines a maximum allowable time in which the holding brake 42 is set. As illustrated in FIG. 6, the second delay time 156 is set greater than the expected delay time 154 required for the holding brake 42 to set.

Figure 7:
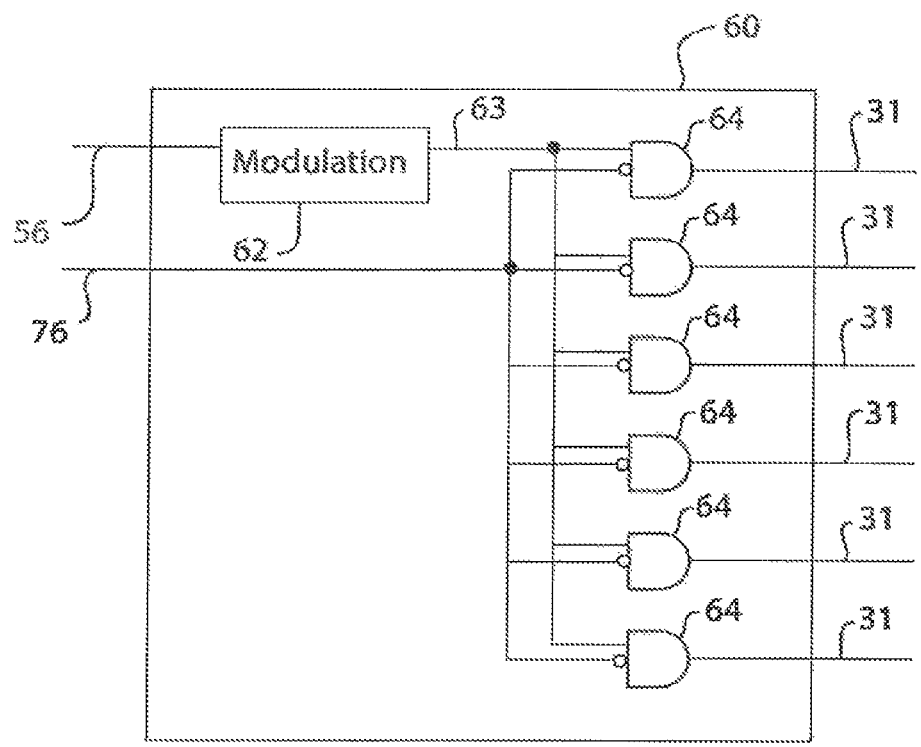
FIG. 7 is a block diagram representation of a portion of the gate driver of FIG. 2.

While commanding the brake to set, the first safety channel is also in communication with the second safety channel. The first safety channel sets an internal status flag requesting a Safety Torque Off (SToff) 164 operation. The second safety channel monitors the SToff 164 signal and waits for the second delay time 156 to ensure that the holding brake 42 has set. At time t3, the second safety channel then disables the torque output from the motor drive 10, as shown by the Torque Off (Toff) signal 166. With the Toff signal 166 set, the motor drive 10 is inhibited from supplying voltage to the motor 40 to prevent torque generation by the motor. With reference also to FIG. 7, the second safety channel uses the safety circuit 70 to output a torque inhibit signal 76 to the gate driver 60 when it is desired to disable torque. For ease of illustration, the torque inhibit signal is illustrated as being supplied to a logical AND-gate 64 along with the output 63 of the modulation routine 62. The output 63 of the modulation routine is a set of gating signals with a separate signal for each transistor 32 in the inverter. It is contemplated that the torque inhibit signal 76 may be a single signal which, prevents each output signal 63 from being supplied to the inverter 30. Optionally, the gate driver 60 may be configured to allow a limited amount of torque to be produced and the gate driver 60 may generate individual torque inhibit signals corresponding to each transistor 32 to temporarily permit some of the modulation signals 63 to be output. According to still another option, the second safety channel may be configured to monitor the feedback signals from the current sensors 54 and may permit a limited amount of torque to be generated by the motor 40 but may set the torque inhibit signal 76 if the current feedback and, therefore, the torque being produced by the motor 40 exceeds a predefined value. When the torque inhibit signal 76 is off, the signal is combined with the output of the modulation routine 62 such that the modulation signals 63 become the gating signals 31 used to control operation of the inverter 30, allowing normal operation of the inverter 30. It is not unusual for a motor drive 10 and motor 40 to be rated with a sufficient voltage and current rating that the resultant torque generated by the motor would exceed the holding torque of the holding brake 42 and cause the motor 40 to drive through brake. By disabling or limiting torque production, the second safety channel prevents a fault in the motor drive from driving through the holding brake and causing undesired motion of the suspended load.

Returning again to FIG. 6, the first safety channel monitors the position feedback signal 48, θ, while the second safety channel is disabling torque production to ensure that position feedback signal 48, θ, remains within the acceptable bandwidth 160. If, as shown at time t4, the holding brake 42 is not able to prevent the load, L, from causing rotation of the motor 40 and the position feedback signal 48, θ, changes beyond an acceptable limit, the first safety channel removes the internal status flag requesting a Safety Torque Off (SToff) 164 operation and a Safe Load Alarm (SLalm) 184 is set. As previously indicated, the second safety channel monitors the Safety Torque Off (SToff) 164 request and immediately removes the Torque Off (Toff) signal 166 upon detection of the holding brake 42 being unable to hold the suspended load. By removing the Torque Off (Toff) signal 166, the gate driver 60 is again able to supply voltage and current to the motor 40 which, in turn, generates torque within the motor 40. The motor 40 may, therefore, provide a second method of holding the suspended load. The motor drive 10 regulates the motor 40 to provide sufficient torque to prevent the suspended load from lowering in the event of a holding brake failure.

The potential still exists for both channels failing. At time t5, the position feedback signal 48, θ, is observed exceeding a second threshold value 182. A second bandwidth 180 is set within the motor drive 10 corresponding to a maximum level of movement of the motor 40 to be detected before setting a fault condition during the safe load retention function. An upper maximum limit 181 and a lower maximum limit 182 define the second bandwidth 180 within which the position feedback signal 48 may change. It is contemplated that the second bandwidth 180 is defined by one or more parameters stored within the memory device 45 of the motor drive 10 and is user configurable according to the application requirements. A single parameter may define the bandwidth 180 or an acceptable difference between the position feedback signal 48, θ, and a change in position. Optionally, a first parameter may define the upper maximum limit 181 and a second parameter may define the lower maximum limit 182. If the position feedback signal 48, θ, remains within the second bandwidth 180 no fault is set. If, however, neither the holding brake 42 nor the motor 40 nor a combination thereof is sufficient to present an undesirable level of motion on the motor 40 a Safe Load Limit (SLlmt) 186 fault condition is set. The fault signal 186 may be provided to a PLC in communication with the motor drive 10 to take any additional action as may be required by the application and as configured within the PLC.

The safe load retention function described herein provides a safety rated control of a suspended load. Two separate channels executing within the motor drive are each configured to safely suspend a load. Each channel monitors the other channel for failure and will operate to suspend the load in the event of a failure of the other channel. Further, the motor drive inhibits operation by the other channel which may cause an undesired motion of the load while one channel is safely operating to suspend the load. This operation requires a drive to remain enabled even while the holding brake is set, such that the motor drive monitors position feedback and re-activates torque in the event the holding brake is unable to suspend the load. Such operation differs from a typical motor controller in which a motor drive would bring a motor to a stop, remove a brake release signal (thereby setting the brake), and the motor drive is then disabled until subsequent operation of the motor is required. In the event the holding brake is unable to suspend the load by itself, the second safety channel may allow the holding brake to remain set to provide some resistance to the load while the motor 40, controlled by the motor drive 10 supplies the additional torque required to suspend the load. Optionally, the motor drive 10 may experience instability if the holding brake is set and the motor drive 10 attempts to supply torque to the load. In this instance, the second safety channel may be configured to cause the holding brake to release and to fully support the suspended load. In either instance, the alarm and/or fault message are provided to alert an operator that one of the safety channels has experienced a failure.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A system for safe retention of loads, the system comprising:
   a motor configured to control operation of a load responsive to rotation of the motor;
   a holding brake configured to prevent rotation of the motor;
   a position feedback device operatively coupled to the motor and configured to generate a position feedback signal corresponding to an angular position of the motor; and
   a motor drive configured to:
      receive a command to stop rotation of the motor,
      bring the motor to a stop responsive to receiving the command,
      control operation of the holding brake via a first safety channel, wherein the first safety channel is operative to set the holding brake responsive to stopping the motor,
      receive a brake set signal corresponding to the holding brake being set,
      monitor the position feedback signal responsive to receiving the brake set signal,
      control operation of torque output to the motor from the motor drive via a second safety channel, wherein the second safety channel is operative to disable torque production from the motor drive responsive to receiving the brake set signal and responsive to the position feedback signal changing less than a predefined threshold within a predefined duration, and
      re-enable torque production via the second safety channel when the position feedback signal changes beyond the predefined threshold with the holding brake set.

2. The system of claim 1, wherein the motor drive further comprises an input configured to receive a safety rated load retention request, and wherein the motor drive is configured to control operation of the holding brake via the first safety channel and to control operation of torque output to the motor responsive to receiving the safety rated load retention request.

3. The system of claim 2, wherein the second safety channel is configured to prevent any torque production within the motor when the safety rated load retention request is received and when the second safety channel determines the holding brake is set.

4. The system of claim 2, wherein the motor drive is configured to limit torque production within the motor to a level that prevents the motor from driving through the holding brake when the safety rated load retention request is received and when the second safety channel determines the holding brake is set.

5. The system of claim 2 wherein the motor drive includes:
   a first controller configured to generate a torque reference corresponding to a desired torque from the motor;
   a safety circuit configured to generate a torque off command; and
   a gate driver circuit configured to:
      receive the torque reference and the torque off command,
      generate gating signals for an inverter within the motor drive to supply current to the motor to achieve the desired torque when the torque off command is disabled, and inhibit gating signals for the inverter within the motor drive to disable torque when the torque off command is enabled.

6. The system of claim 1 wherein the holding brake is operatively mounted to the motor and is configured to prevent rotation of a motor shaft.

7. The system of claim 1 wherein the holding brake is mounted remotely from the motor and is configured to prevent rotation of a shaft in a drive train, wherein the drive train is controlled by the motor.

8. A method for safe retention of loads, the method comprising the steps of:
receiving a safety rated load retention request at a motor drive, wherein the motor drive is operatively connected to a motor configured to lift a load responsive to rotation of the motor;
bringing the motor to a stop with the motor drive responsive to receiving the safety rated load retention request;
setting a holding brake, configured to prevent rotation of the motor, with the motor drive via a first safety channel within the motor drive responsive to the motor drive stopping the motor;
receiving a brake set signal corresponding to the holding brake being set,
monitoring a position feedback signal responsive to receiving the brake set signal,
disabling torque production from the motor drive via a second safety channel within the motor drive responsive to receiving the brake set signal and responsive to the position feedback signal changing less than a predefined threshold within a predefined duration;
and
re-enabling torque production via the second safety channel when the position feedback signal changes beyond the predefined threshold with the holding brake set.

9. The method of claim 8, wherein the step of disabling torque production results in the second safety channel preventing any torque production within the motor when the safety rated load retention request is received and when the second safety channel determines the holding brake is set.

10. The method of claim 8, wherein the step of disabling torque production results in the second safety channel limiting torque production within the motor to a level that prevents the motor from driving through the holding brake when the safety rated load retention request is received and when the second safety channel determines the holding brake is set.

11. The method of claim 8 further comprising a step of:
controlling operation of the motor with a first controller in the motor drive, wherein the first controller is configured to generate a torque reference corresponding to a desired torque from the motor, and wherein the step of disabling torque production further comprises:
generating a torque off command with a safety circuit in the motor drive; and
inhibit gating signals for an inverter within the motor drive when the torque off command is enabled.

12. A motor controller for safely retaining loads, the motor controller comprising:
a motor output configured to supply voltage to a motor operatively connected to the motor controller;
a brake output configured to supply an output signal, wherein the output signal is configured to control operation of a holding brake operatively coupled to the motor to prevent rotation of the motor;
a position feedback input configured to receive a position feedback signal generated by a position feedback device operatively coupled to the motor;
a controller configured to:
receive a safety rated load retention request, wherein the motor is configured to control operation of a load responsive to rotation of the motor;
bring the motor to a stop responsive to receiving the safety rated load retention request;
generate the output signal for the brake output with a first safety channel responsive to the motor drive stopping the motor;
receive a brake set signal corresponding to the holding brake being set,
monitor the position feedback signal responsive to receiving the brake set signal,
disable torque production from the motor controller via a second safety channel within the motor drive responsive to receiving the brake set signal and responsive to the position feedback signal changing less than a predefined threshold within a predefined duration;
and
re-enable torque production via the second safety channel when the position feedback signal changes beyond the predefined threshold when the output signal is being generated.

13. The motor controller of claim 12, wherein the second safety channel is configured to prevent any torque production within the motor when the safety rated load retention request is received.

14. The motor controller of claim 12, wherein the motor drive is configured to limit torque production within the motor to a level that prevents the motor from driving through the holding brake when the safety rated load retention request is received.

15. The motor controller of claim 12 further comprising:
a first controller configured to generate a torque reference corresponding to a desired torque from the motor;
a safety circuit configured to generate a torque off command; and
a gate driver circuit configured to:
receive the torque reference and the torque off command,
generate gating signals for an inverter within the motor controller to supply current to the motor to achieve the desired torque when the torque off command is disabled, and
inhibit gating signals for the inverter within the motor controller to disable torque when the torque off command is enabled.

* * * * *